(12) United States Patent
Weston et al.

(10) Patent No.: US 9,967,077 B2
(45) Date of Patent: May 8, 2018

(54) COMMUNICATIONS DEVICE SERVING AS TRANSMISSION CONTROL PROTOCOL (TCP) PROXY

(71) Applicant: HARRIS CORPORATION, Melbourne, FL (US)

(72) Inventors: Jeffery H. Weston, Webster, NY (US); Eric N. Koski, Fairport, NY (US)

(73) Assignee: HARRIS CORPORATION, Melbourne, FL (US)

( * ) Notice: Subject to any disclaimer, the term of this patent is extended or adjusted under 35 U.S.C. 154(b) by 111 days.

(21) Appl. No.: 14/919,773

(22) Filed: Oct. 22, 2015

(65) Prior Publication Data
US 2017/0117999 A1 Apr. 27, 2017

(51) Int. Cl.
*H04L 12/26* (2006.01)
*H04L 5/00* (2006.01)
(Continued)

(52) U.S. Cl.
CPC ........ *H04L 5/0055* (2013.01); *H04L 41/0654* (2013.01); *H04L 43/0864* (2013.01);
(Continued)

(58) Field of Classification Search
CPC . H04L 43/50; H04L 43/0852; H04L 2209/26; H04L 12/26; H04L 2012/5628; H04L 1/244; H04J 3/14
(Continued)

(56) References Cited

U.S. PATENT DOCUMENTS 7,313,635 B1 * 12/2007 Zavalkovsky .......... H04L 12/66
370/352
7,315,515 B2 1/2008 Pazos
(Continued)

FOREIGN PATENT DOCUMENTS

| WO | 01/65805 | 9/2001 |
| WO | 2014/031046 | 2/2014 |

OTHER PUBLICATIONS

Alcaraz et al., "Combining ACK Rate Control and AQM to Enhance TCP Performance Over 3G Links," Proceedings of the ACM International Workshop on Performance Monitoring, Measurement, and Evaluation of Heterogeneous Wireless and Wired Networks, 2006; 9 pages.
(Continued)

*Primary Examiner* — Rebecca E Song
(74) *Attorney, Agent, or Firm* — Allen, Dyer, Doppelt + Gilchrist, P.A.

(57) ABSTRACT

A communications system includes a sender device configured to send data packets in accordance with a Transmission Control Protocol (TCP) to a receiver device. An intermediate device is coupled between the sender device and the receiver device and includes a wireless transceiver configured to provide a communications link between the sender device and the receiver device and wherein said communications link is susceptible to at least one of transmission delays and transmission errors. A controller is coupled to the wireless transceiver and configured to serve as a TCP proxy between the sender device and the receiver device by sending successive simulated TCP acknowledgements of delivery to the sender device starting at a delay time shorter than a TCP retransmission timeout period and increasing for each successive simulated TCP acknowledgement.

24 Claims, 4 Drawing Sheets

(51) Int. Cl.
  *H04L 12/24* (2006.01)
  *H04L 29/08* (2006.01)
  *H04W 88/18* (2009.01)
  *H04L 12/861* (2013.01)
  *H04L 29/06* (2006.01)

(52) U.S. Cl.
  CPC .......... *H04L 49/90* (2013.01); *H04L 63/0471* (2013.01); *H04L 63/0492* (2013.01); *H04L 63/168* (2013.01); *H04L 69/326* (2013.01); *H04W 88/182* (2013.01)

(58) Field of Classification Search
  USPC ....................................................... 370/225
  See application file for complete search history.

(56) References Cited

U.S. PATENT DOCUMENTS

| | | | |
|---|---|---|---|
| 7,720,063 B2 | 5/2010 | Maiorana et al. | |
| 8,032,809 B2 | 10/2011 | Park et al. | |
| 8,320,250 B2 | 11/2012 | Speight | |
| 8,359,405 B1 | 1/2013 | Border et al. | |
| RE44,715 E | 1/2014 | Speight et al. | |
| 8,639,835 B2 | 1/2014 | Kotecha et al. | |
| 8,792,590 B2 | 7/2014 | Furman | |
| 8,854,992 B2 | 10/2014 | Xu et al. | |
| 8,914,480 B1 | 12/2014 | Jones et al. | |
| 2001/0047474 A1* | 11/2001 | Takagi | H04L 63/04 713/151 |
| 2003/0235206 A1* | 12/2003 | Heller | H04L 47/10 370/467 |
| 2005/0063302 A1* | 3/2005 | Samuels | H04L 41/00 370/229 |
| 2005/0135248 A1* | 6/2005 | Ahuja | H04L 47/10 370/235 |
| 2005/0141455 A1* | 6/2005 | Kim | H04W 80/00 370/331 |
| 2009/0279429 A1 | 11/2009 | Griffoul | |
| 2010/0071021 A1* | 3/2010 | Friedman | H04N 5/4403 725/133 |
| 2012/0290727 A1 | 11/2012 | Tivig | |
| 2013/0252558 A1* | 9/2013 | Nieto | H04W 72/08 455/73 |

OTHER PUBLICATIONS

Border et al., "Performance Enhancing Proxies Intended to Mitigate Link-Related Degradations," Network Working Group, Request for Comments: 3135; The Internet Society, Jun. 2001; pp. 1-45.

Wu et al., "ACK Delay Control for Improving TCP Throughout Over Satellite Links," IEEE International Conference on Networks, Sep.-Oct. 1999; 11 pages.

Meyer et al., "Performance Evaluation of a TCP Proxy in WCDMA Networks", IEEE Wireless Communications, Oct. 2003, pp. 70-79.

* cited by examiner

COMMUNICATIONS DEVICE SERVING AS TRANSMISSION CONTROL PROTOCOL (TCP) PROXY

FIELD OF THE INVENTION

The present invention relates to the field of wireless communications, and more particularly, to a wireless communications device serving as a Transmission Control Protocol (TCP) proxy and related methods.

BACKGROUND

Some multi-band or other tactical radios operate in the High Frequency (HF), Very High Frequency (VHF), and/or Ultra High Frequency (UHF) band for wireless communications. These transmit modes may be governed by the MIL-STD-188-141C standard, while data modulation/demodulation may be governed by the MIL-STD-188-110C standard, the disclosures which are incorporated by reference in their entirety. Alternatively, the transmit modes and data modulation/demodulation may be governed by other standards such as the NATO Standards STANAG 4538, STANAG 4539, or STANAG 4415, which are incorporated by reference in their entirety. An example multi-band tactical radio that may use HF, VHF, and UHF is the Joint Tactical Radio System (JTRS). The HF tactical radios as communications devices communicate long range at distances up to 3,000 Km or more as compared to VHF and UHF that commonly use short-range line-of-sight (LOS) communication links of typically 25 km or less. HF communications may require less infrastructure as compared to conventional, land mobile, cellular, and satellite voice and/or data communications systems that typically use a land-based infrastructure. HF radios are also rapidly deployable, and fixed base stations may provide command and control for mobile (vehicle mounted) and portable (manpack) users in the field. For that reason, many emergency and military communications devices have HF capability.

Systems providing wireless data communications services may employ link layer (Layer 2) protocols known as data link protocols, such as the NATO STANAG 5066 data link protocol or the data link protocols of NATO STANAG 4538, in order to deliver data with higher performance and reliability; these standards are incorporated by reference in their entirety.

In providing data communications services, these devices may use the Internet Protocol (IP) for packet construction and the Transmission Control Protocol (TCP) to enable devices to establish a connection, divide the payload data into data segments (also known as packets), deliver the data segments across the network, acknowledge data segments that have been successfully delivered, and ensure payload data segments are delivered in order. However, TCP may only work poorly, if at all, on some wireless links such as HF radio links because channel errors and congestion, as well as the waveform and protocol features intended to compensate for them, may cause long and variable data segment delivery latency, and result in spurious TCP retransmissions and, ultimately, transfer failures as TCP abandons the transfer due to excessive timeouts.

In TCP, the receiver device generates an acknowledgement back to the sender device when it has received a data segment (Hereafter, data segments may also be referred to as "packets," "data packets," "TCP segments," or "TCP packets," as will be understood by one skilled in the art). Upon receipt of the acknowledgement, the sender calculates corresponding the Round Trip Time (RTT, the time interval beginning when the segment is first sent and ending when the corresponding segment acknowledgement is received), and uses that RTT for determination of future timeouts. The TCP calculates the RTT to manage the data flow. In networks which include long-latency links (such as the wireless links discussed above), the TCP estimate of RTT may be sufficiently short (as compared to the actual RTT) so as to cause excessive retransmissions. The TCP RTT algorithm does not recalculate RTT based on acknowledgments that relate to retransmitted packets (since it is not possible to determine whether the acknowledgement is in response to the original transmission or one of the retransmissions), and thus retains an unrealistically short RTT estimate. Because the actual RTT is long, the TCP connections may not have time to adapt, and may thus fail, causing TCP connection timeouts, which ultimately result in communication failures.

TCP acceleration uses a TCP proxy as a performance enhancing proxy (PEP) and manages the interface in a more active manner. The TCP proxy intercepts IP packets containing TCP data segments as they are routed and masquerades as the TCP final destination (with respect to the sender) by sending simulated acknowledgements to the sender; the TCP proxy then transports the packets through the problematic link that is creating a delay, after which the packets are delivered to the ultimate destination. Even with a TCP proxy, however, wireless links such as HF links may still experience high error rates and high latency, in particular when operating under the STANAG 5066 standard that recommends transmitting for up to 120 seconds or more and then waiting for the acknowledgement before transmitting again. This creates an actual packet RTT of over two minutes, which may detrimentally impact the operation of the TCP protocol. There may also be high latency variability when a data packet is received in error and its latency may exceed four minutes or more as error rates rise. Adaptive data link protocols such as the STANAG 5066 data link protocol often respond by lowering the data rate for increased robustness, further increasing the RTT. In an HF data link, TCP timeouts may sometimes expire before a final acknowledgement is received. This may occur in the middle of a message if there were some packet errors on the communications link, while the backlog at the proxy is near a buffer maximum. Such timeouts may cause the TCP connection to fail, ultimately causing communications failures.

SUMMARY

A communications system may comprise a sender device configured to send data packets in accordance with a Transmission Control Protocol, and a receiver device configured to receive the data packets from the sender device. To deliver packets from the sender to the receiver, it may be necessary to traverse a link with high latency. At least one intermediate device supporting this link is placed between the sender device and the receiver device and comprises a wireless transceiver configured to provide a communications link between the sender device and the receiver device. This communications link may be susceptible to at least one of delays and transmission errors. A controller is coupled to the wireless transceiver, and is configured to serve as a TCP proxy between the sender device and the receiver device by sending successive simulated TCP acknowledgements of delivery to the sender device starting at a delay time shorter than a TCP retransmission timeout period and increasing for each successive simulated TCP acknowledgement.

The controller may be configured to increase the delay time before each simulated TCP acknowledgement until its value becomes approximately equal to an estimate of the actual round trip time (RTT) for the data packets from the sender device to the receiver device. The controller may comprise a processor and a memory coupled thereto and configured to buffer data packets. The processor may be configured to generate a simulated TCP acknowledgement of delivery after buffering a plurality of data packets in the memory. The delay time before sending a first simulated TCP acknowledgement of delivery may be any value, but is typically selected to be less than the expected TCP retransmission timeout.

The wireless transceiver and controller may comprise a software defined radio. The controller may comprise a cryptographic unit configured to encrypt sensitive data. The controller may comprise a processor coupled to the cryptographic unit and configured to process and forward sensitive data to the cryptographic unit and receive encrypted data and format the encrypted data into data packets. The wireless transceiver may be operable in a frequency range of 1.5 to 30 MHz. The wireless transceiver may be operable in a frequency range of 30 to 300 MHz. The wireless transceiver may be operable in a frequency range of 300 MHz to 2 GHz.

A method of communicating comprises sending data packets in accordance with a Transmission Control Protocol from a sender device to a receiver device and processing the data packets within at least one intermediate device coupled between the sender device and the receiver device. The intermediate device comprises a wireless transceiver configured to provide a wireless communications link between the sender device and the receiver device. This link is susceptible to at least one of delays and transmission errors. A controller is coupled to the wireless RF transceiver and configured to serve as a TCP proxy between the sender device and the receiver device by sending successive simulated TCP acknowledgements of delivery to the sender device starting at a delay time shorter than a TCP retransmission timeout period and possibly increasing for each successive simulated TCP acknowledgement.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

Figure 1:
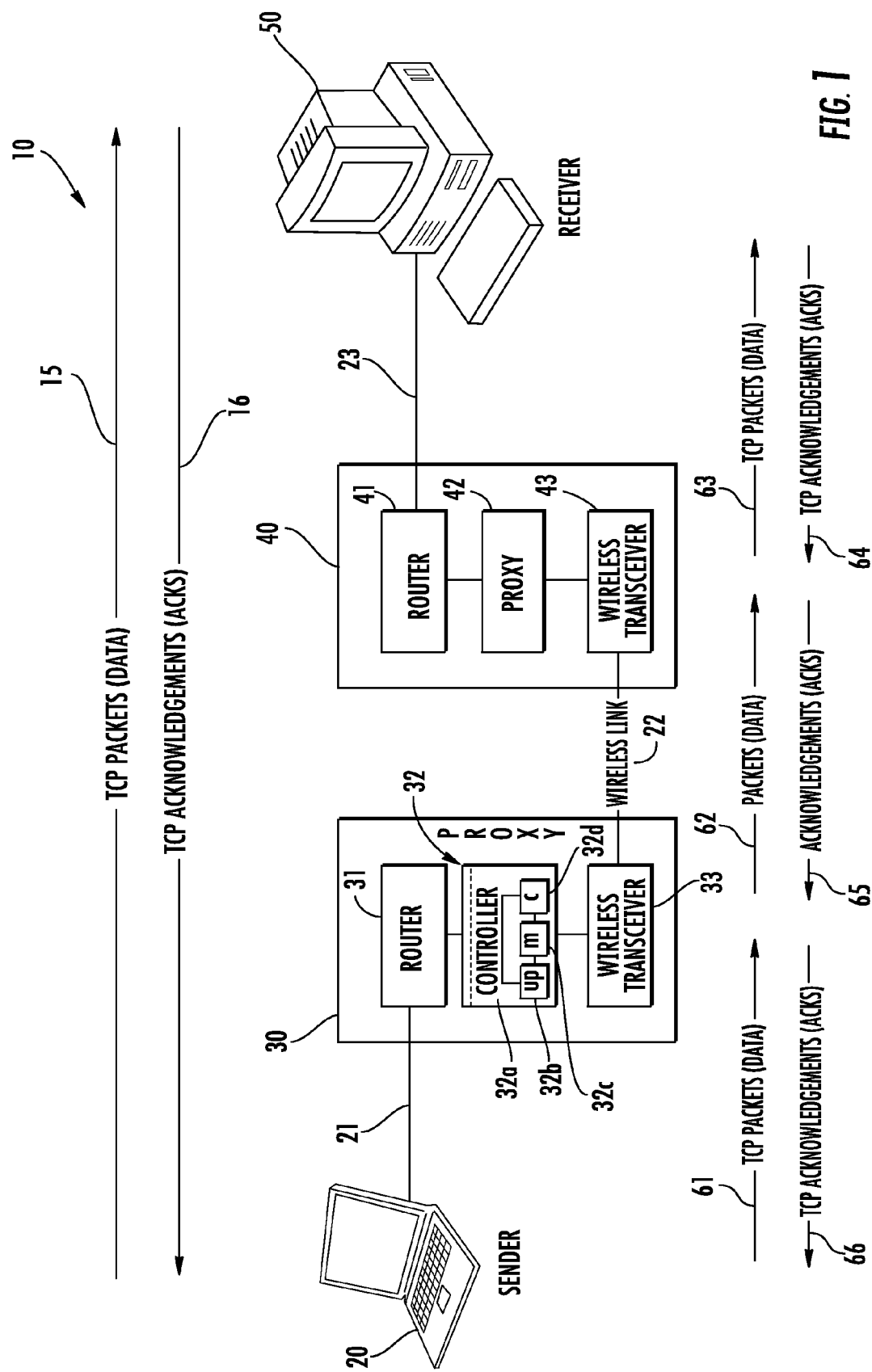
FIG. 1 is a schematic block diagram of a communications network showing intermediate devices connected by a wireless link, and operating as a TCP proxy in accordance with a non-limiting example.

Referring now to FIG. 1, there is illustrated a communications system at 10, in accordance with a non-limited example, and showing a sender device 20 configured to send data packets in accordance with the Transmission Control Protocol (TCP) to a receiver device 50 that is configured to receive the data packets from the sender device. Between the sender and receiver are two network nodes 30, 40 as communications devices and preferably wireless communications devices. The sender 20 and the network node 30 are connected via an ordinary network connection 21 (for example, Ethernet, WiFi, or other supported connection type), and the receiver 50 and the network node 40 are connected via an ordinary network connection 23 (for example, Ethernet, WiFi, or other supported connection type). Each network node 30, 40 includes a router 31, 41, a TCP proxy agent 32, 42, and a wireless transceiver 33, 43 as a radio frequency (RF) transceiver. The wireless transceivers are connected by a wireless link 22. Note that both the router and the TCP proxy agents may be implemented as separate hardware or co-resident in shared hardware, including the possibility of both the router and TCP proxy agent being software components of the wireless transceiver.

It is possible the devices 30, 40 such as illustrated at 30, may include a controller 32a forming the proxy and include a processor 32b connected to a memory 32c and cryptographic unit 32d that encrypts sensitive data. The processor 32b may process and forward sensitive data to the cryptographic unit 32d and receive encrypted data and format it into data packets.

In a normal transmission using TCP, the sender device 20 transmits data packets addressed to the receiver device 50. The packets are routed over the various network connections to the receiver 50, as indicated by the data arrow 15. Upon receipt of the data packets, the receiver 50 then sends an acknowledgement back to the sender 20 represented by the acknowledgement arrow 16 to the sender. The sender 20 records the successful transmission of the data and sends further packets, which are in turn acknowledged, until the entire series of data packets has been transferred and the connection is successfully terminated.

The system 10 as described operates using TCP as a connection-oriented protocol where a connection is established and maintained until the application programs at each end have finished exchanging application data. TCP operates to break application data into data packets that the network can deliver and sends data packets to and accepts packets from a network layer and manages the data packet flow control. The TCP operates with the internet protocol (IP). The IP protocol implements packet formation while TCP enables two or more devices to establish a connection and exchange streams of data. The TCP desirably guarantees delivery of data, and desirably guarantees that data packets will be delivered in the same order in which they were transmitted.

As explained in further detail below, the system 10 uses TCP acceleration to achieve better data packet throughput on high-latency data connections such as wireless data links without modifying the end applications. In this example, the sender 20 and the receiver 50 are considered to be standard, unmodified network devices. TCP Acceleration uses a TCP Proxy also referred to as a Performance Enhancing Proxy (PEP) that interfaces as an intermediate device 32, 42 between the sender 20 and receiver 50 devices. The intermediate proxy 32 operates as a TCP accelerator and breaks the end-to-end TCP flow control loop as shown in FIG. 1 by breaking that longer TCP flow control loop into several smaller loops. This is done by intercepting the packets at the sender-side proxy 32 and relaying the packets via the wireless link 22 to the receiver-side proxy 42, which then routes the packets to the receiver 50 via ordinary TCP.

The data packets that originate from the sender 12 are buffered at the send-side proxy 32 while they are being forwarded over the wireless link 22 to the receive-side proxy 42 using the wireless transceivers 33, 43, which may include the need for local retransmissions in the event of packet loss. Thus, in the case of data packet losses, the feedback loop between the sender 20 and receiver 50 is shortened to the one between the sender 20 and the send-side proxy 31 (represented by the data and ack arrows 61, 66) and decoupled from the wireless link feedback loop (data arrows 62, 65) and the receiver side feedback loop (data arrows 63, 64). As noted before, TOP is vulnerable to long delivery times and latencies such as are often encountered in HF radio and other wireless data links, and the system 10 as described addresses issues involved with the delivery latencies of HF radio links or other wireless links and TCP.

The intermediate devices 30, 40 are functionally similar to each other, although there is no requirement for them to be identical as long as they provide compatible interfaces to each other. These devices include a network routing function as a router 31, 41 which is responsible for providing a normal network interface at one end of the network connection 21 or 23, as well as network routing capabilities. The devices 31, 41 also provide an interface to the TCP proxy 32, 42. The TCP proxy 32, 42 in turn has an interface to the wireless transceiver 33, 43, which is configured to provide a communications link 22 between the devices 30, 40. In an example, because the wireless link 22 preferably operates in HF (3-30 MHz), it is susceptible to potentially lengthy transmission delays and transmission errors which may result in the need for retransmissions. It should be understood that the system 10 is applicable to VHF (30-300 MHz) and UHF (300 MHz-3 GHz), as well as other communications systems which may experience transmission delays and transmission errors. The intermediate devices 30, 40 are formed as software-defined radios in a non-limiting example. As such, the intermediate devices 30, 40 may provide additional capabilities including encryption, link protection, and/or frequency hopping.

The intermediate device 30 is configured to serve as the TCP proxy between the sender 20 and the receiver 50 by sending successive simulated TCP acknowledgements of delivery to the sender device starting at a delay time shorter than the TCP retransmission timeout and possibly increasing for successive simulated acknowledgements. The proxy 32 is configured to increase this delay time until reaching an estimate of the actual round trip time (RTT) for the data packets from the sender 20 to the receiver 50. This in effect allows the TCP implementation at the sender 20 to calculate an estimate of the actual RTT sooner than normal TCP or an ordinary accelerated TCP proxy would accomplish this. Variations in the actual RTT will continue to occur, but since the TCP implementation at 20 has been trained to expect a longer RTT, the likelihood of TCP timeouts and potential TCP connection failures at the sender is greatly reduced. As a result, transfers are more robust and can operate at higher data rates and on more severely degraded wireless links. The system 10 allows a more stable connection with higher throughput and improved reliability in a wider range of conditions.

In operation, the send-side proxy 32 is configured to buffer packets in memory and forward the packets to the wireless transceiver 33 for transfer over the wireless link 22. As each packet is received and buffered at the send-side proxy 32, a timeout is set so that, when the timeout expires, the send-side proxy 32 generates and sends a corresponding simulated TCP acknowledgement addressed to the sender 20. The delay time before sending the first TCP acknowledgement may range from about 2 to about 3 seconds, for example. These values can vary depending on communication conditions and the type of communications devices used in the system 10.

When packets are received at the receive-side proxy 42, each packet is immediately forwarded to the receiver 50. The receiver 50 then generates a TCP acknowledgement addressed to the sender 20. When that acknowledgement is received at the receive-side proxy 42, it is discarded (since the simulated acknowledgement has already been delivered in place of the real acknowledgement, it is not necessary to use any additional wireless link 22 bandwidth delivering the real acknowledgement).

Figure 2:
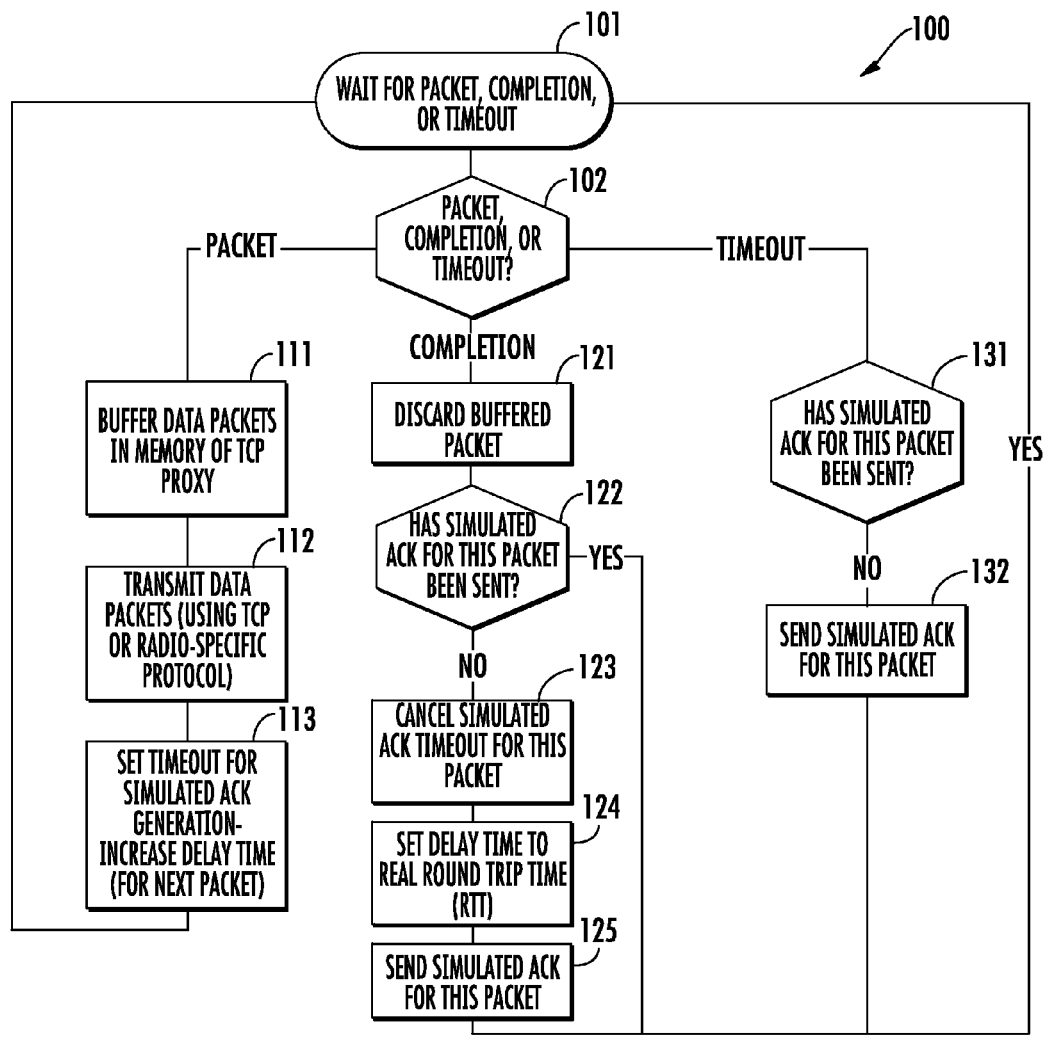
FIG. 2 is a flowchart illustrating operation of the communications system of FIG. 1 in accordance with a non-limiting example.

FIG. 2 is a flowchart 100 illustrating an example method of operating the system 10, in accordance with a non-limiting example. The proxy process waits (Block 101) for a packet, completion (from the wireless transceiver 33) or a timeout. When the sender device 20 transmits a packet to the receiving device 50 using TCP, the packet arrives at the send-side proxy 32. The packet is buffered in memory (Block 111) passed on to the wireless Transceiver 33 (Block 112) to be forwarded to the receive-side proxy 42 using a data link protocol appropriate to the wireless Link 22. The send-side proxy 32 then sets a timeout event for a programmed time in the future, and increases the programmed delay time by a programmed amount (Block 113) before returning to wait for more events (Block 101). When a timeout occurs, if the packet referenced in the timeout has not been acknowledged yet (Block 131), the send-side proxy 32 sends a simulated acknowledgement to the sender 20 (Block 132) and control returns to wait for more events. When a completion event occurs (signifying that the wireless transceiver has successfully sent the packet to the receive-side intermediate node 40), the buffered packet is discarded (Block 121). If the simulated acknowledgement has not already been sent (Block 122), the send-side proxy 32 cancels the timeout for this packet ack (Block 123), sets the programmed delay time to the measured packet round-trip time (Block 124), and sends the simulated ack to the sender 20, (Block 125), before control returns to wait for more events.

Figure 3:
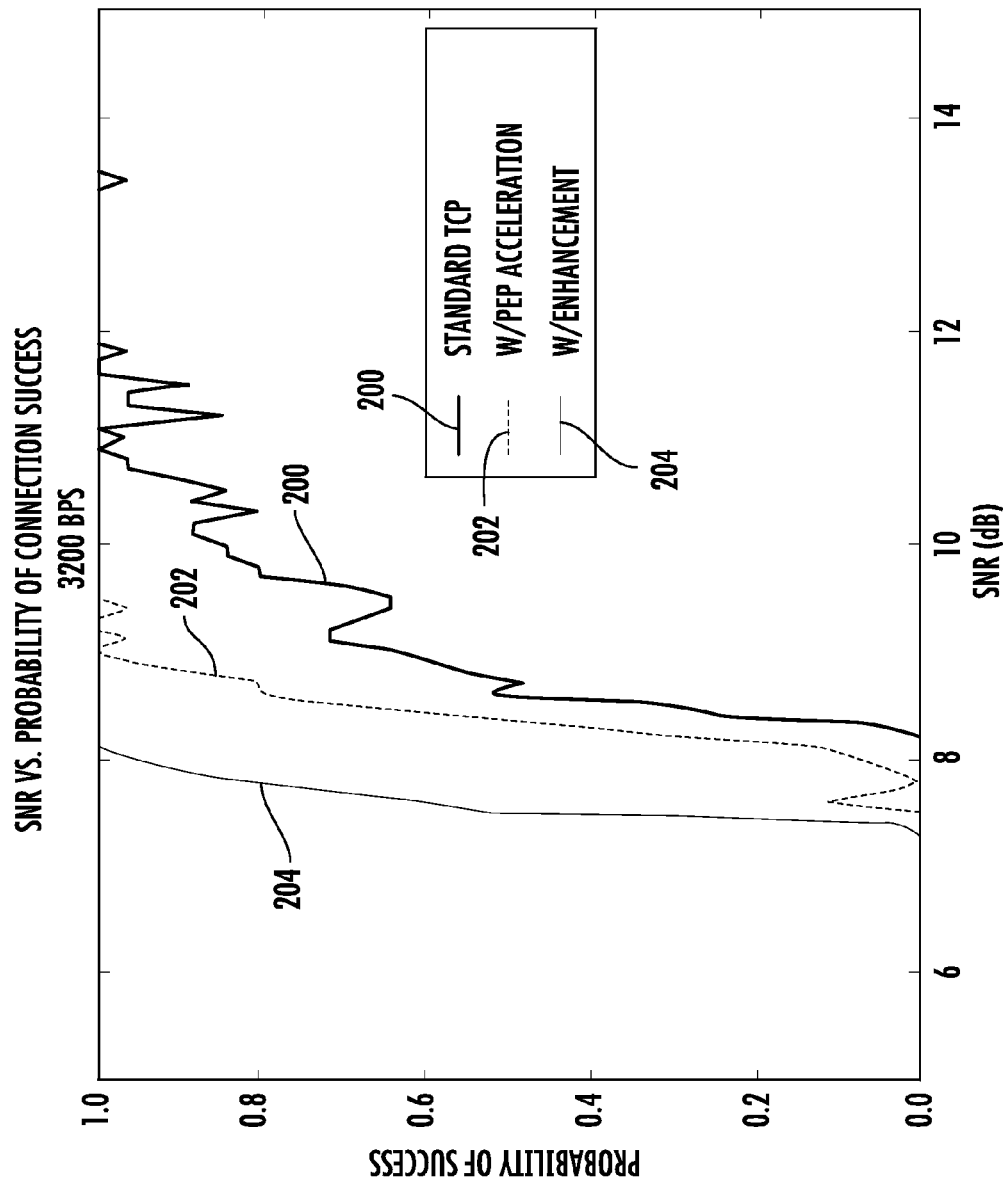
FIG. 3 is a graph of a simulation showing the probability of connection success versus the signal-to-noise ratio (SNR) with the system in accordance with a non-limiting example.

FIG. 3 shows a graph of the results of a simulation where the probability of a success is on the vertical axis and the signal-to-noise (SNR) ratio in decibels is on the horizontal axis. This graph depicts the probability of connection success versus the SNR. A system using standard TCP in a connection between a sender device 20 and receiver device 50 without a proxy for TCP acceleration is shown with the line at 200. A system using a proxy and conventional TCP acceleration is shown at line 202. The line at 204 shows the system 10 in accordance with a non-limiting example when the send-side proxy 32 serves as the TCP proxy and sends successive simulated TCP acknowledgements of delivery to the sender device 20 starting at a delay time shorter than a TCP retransmission timeout and increasing for each successive simulated TCP acknowledgement until reaching an approximation of the actual round trip time. This simulation graph shows the probability of success and the reduced SNR and benefits of using the system 10. This simulation indicates it is possible to run a modem faster and sustain a faster link without the attendant risk of a connection timeout. If the system 10 is operated at a similar data rate as a normal TCP acceleration, the results may be close, with the system 10 using the delayed ACK's usually a few bits per second ahead. This results in the system avoiding dropped connections, and when conditions allow, running the link at a faster rate.

An example radio that may be used as the wireless transceiver 33, 43 and operate as a mobile wireless communications device in the system 10 is a Falcon III wireless-7800H-MP wideband HF/VHF radio system. This radio system provides continuous coverage from 1.5 to 60 MHz, 20 watts HF, and 10 watts VHF on the power of one battery and bandwidths from 3 to 24 kHz and data rates up to 120 kbps. It operates with robust 3G waveforms and voice and SMS messaging in channels where legacy waveforms do not work. The radio may incorporate enhanced anti-jamming measures and embedded Citadel and AES encryption. It may feature high-performance automatic link establishment (ALE) and data link protocols for reliable linking and error-free data transfer. This radio may include an internal GPS receiver and telephony and feature a Software-Defined Radio (SDR) architecture. It operates as a compact HF manpack radio. Other Falcon III radios may implement the system 10 and method and are not limited to HF and VHF communication systems and may use multiple waveforms at frequencies from 1.5 MHz up to 2 GHz, including L-band SATCOM and MANET. The waveforms may provide secure IP data networking. One particular class of software-defined radio that may be used is the Joint Tactical Radio (JTR), which includes waveform software modules to implement the communication waveforms the radio will require. JTR radios also use operating environment software that conforms with the software communications architecture (SCA) specification at http://www.public.navy.mil/jtnc/sca, which is hereby incorporated by reference in its entirety. The SCA is an open architecture framework that specifies how hardware and software components are to interoperate so that different manufacturers and developers can readily integrate the respective components into a single device.

The Joint Tactical Radio System (JTRS) Software Component Architecture (SCA) defines a set of interfaces and protocols, often based on the Common Object Request Broker Architecture (CORBA), for implementing a Software Defined Radio (SDR). In part, JTRS and its SCA are used with a family of software re-programmable radios. As such, the SCA is a specific set of rules, methods, and design criteria for implementing software re-programmable digital radios.

The JTRS SCA specification is published by the US Department of Defense Joint Tactical Networking Center (JTNC). The JTRS SCA has been structured to provide for portability of applications software between different JTRS SCA implementations, leverage commercial standards to reduce development cost, reduce development time of new waveforms through the ability to reuse design modules, and build on evolving commercial frameworks and architectures.

The JTRS SCA is not a system specification, as it is intended to be implementation independent, but a set of rules that constrain the design of systems to achieve desired JTRS objectives. The software framework of the JTRS SCA defines the Operating Environment (OE) and specifies the services and interfaces that applications use from that environment. The SCA OE comprises a Core Framework (CF), a CORBA middleware, and an Operating System (OS) based on the Portable Operating System Interface (POSIX) with associated board support packages. The JTRS SCA also provides a building block structure (defined in the API Supplement) for defining application programming interfaces (APIs) between application software components.

The JTRS SCA Core Framework (CF) is an architectural concept defining the essential, "core" set of open software Interfaces and Profiles that provide for the deployment, management, interconnection, and intercommunication of software application components in embedded, distributed-computing communication systems. Interfaces may be defined in the JTRS SCA Specification.

Figure 4:
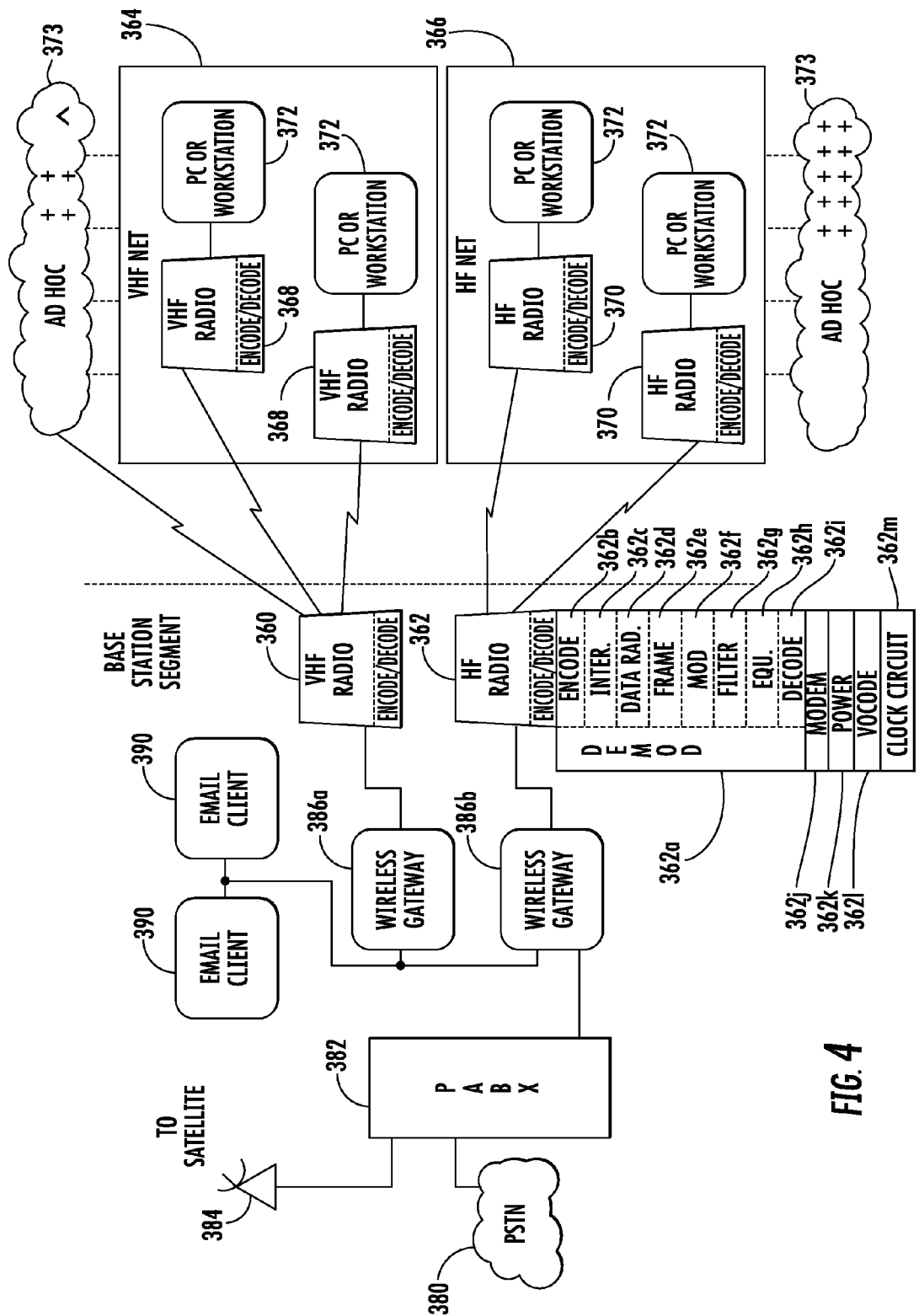
FIG. 4 is block diagram of an example communications system that can be used and modified in accordance with a non-limiting example.

A brief description of an example of a communications system that includes communications devices that may incorporate the system using TCP and simulated acknowledgements as described above, in accordance with a non-limiting example, is described relative to a non-limiting example shown in FIG. 4. This high-level block diagram of a communications system includes a base station segment and wireless message terminals that could be modified for use with the present invention. The base station segment includes a VHF radio 360 and HF radio 362 that communicate and transmit voice or data over a wireless link to a VHF net 364 or HF net 366, each which include a number of respective VHF radios 368 and HF radios 370, and personal computer workstations 372 connected to the radios 368, 370. Ad-hoc communication networks 373 are interoperative with the various components as illustrated. The entire network can be ad-hoc and include source, destination and neighboring mobile nodes. Thus, it should be understood that the HF or VHF networks include HF and VHF net segments that are infrastructure-less and operative as the ad-hoc communications network. Although UHF and higher frequency radios and net segments are not illustrated, these could be included.

The radio can include a demodulator circuit 362a and appropriate convolutional encoder circuit 362b, block interleaver 362c, data randomizer circuit 362d, data and framing circuit 362e, modulation circuit 362f, matched filter circuit 362g, block or symbol equalizer circuit 362h with an appropriate clamping device, deinterleaver and decoder circuit 362i modem 362j, and power adaptation circuit 362k as non-limiting examples. A vocoder circuit 362l can incorporate the decode and encode functions and a conversion unit could be a combination of the various circuits as described or a separate circuit. A clock circuit 362m can establish the physical clock time and through second order calculations, a virtual clock time. The network can have an overall network clock time. These and other circuits operate to perform any functions necessary for the present invention, as well as other functions suggested by those skilled in the art. Other illustrated radios, including all VHF (or UHF) and higher frequency mobile radios and transmitting and receiving stations can have similar functional circuits. Radios could range from 1.5 MHz to about 2 GHz as non-limiting examples.

The base station segment includes a landline connection to a public switched telephone network (PSTN) 380, which connects to a PABX 382. A satellite interface 384, such as a satellite ground station, connects to the PABX 382, which connects to processors forming wireless gateways 386a, 386b. These interconnect to the VHF radio 360 or HF radio 362, respectively. The processors are connected through a local area network to the PABX 382 and e-mail clients 390. The radios include appropriate signal generators and modulators.

An Ethernet/TCP-IP local area network could operate as a "radio" mail server. E-mail messages could be sent over radio links and local air networks using STANAG-5066 as second-generation protocols/waveforms, the disclosure which is hereby incorporated by reference in its entirety and, of course, preferably with the third-generation interoperability standard: STANAG-4538, the disclosure which is hereby incorporated by reference in its entirety. Examples of equipment that can be used in the present invention include different messaging terminals and radios manufactured by Harris Corporation of Melbourne, Fla. This equipment could include RF-5800, RF-7800, RF-5710, AN/PRC-150(c), and AN/PRC117 series equipment and devices as non-limiting examples.

These systems can be operable with RF-5710A high-frequency (HF) modems and with the NATO standard known as STANAG 4539, the disclosure which is hereby incorporated by reference in its entirety, which provides for transmission of long distance radio at rates up to 9,600 bps. In addition to modem technology, those systems can use wireless email products that use a suite of data-link protocols designed and perfected for stressed tactical channels, such as STANAG 4538 or STANAG 5066, the disclosures which are hereby incorporated by reference in their entirety. It is also possible to use a fixed, non-adaptive data rate as high as 19,200 bps with a radio set to ISB mode and an HF modem set to a fixed data rate. It is possible to use conventional ARQ techniques and/or Type II hybrid-ARQ techniques.

The systems and methods disclosed herein are applicable to many communications systems other than the specific examples provided herein. Accordingly, any modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications system comprising:
   a sender device configured to send data packets in accordance with a Transmission Control Protocol (TCP);
   a receiver device configured to receive the data packets from said sender device; and
   at least one intermediate device coupled between said sender device and said receiver device and comprising
      a wireless transceiver configured to provide a communications link between said sender device and receiver device wherein said communications link is susceptible to at least one of transmission delays and transmission errors, and
      a controller coupled to said wireless transceiver and configured to serve as a TCP proxy between said sender device and said receiver device by sending successive simulated TCP acknowledgements of delivery to the sender device over the communications link in accordance with the TCP starting at a delay time shorter than a TCP retransmission timeout period and increasing the delay time for each successive simulated TCP acknowledgement;
   wherein the TCP is maintained throughout the communications link between said sender device and receiver device.

2. The communications system according to claim 1 wherein said controller is configured to increase the delay time until the delay time is equal to an actual round trip time (RTT) for the data packets from said sender device to said receiver device.

3. The communications system according to claim 1 wherein said controller comprises a processor and a memory coupled thereto and configured to buffer data packets.

4. The communications system according to claim 3 wherein said processor is configured to generate a simulated TCP acknowledgement of delivery after buffering a plurality of data packets in the memory.

5. The communications system according to claim 1 wherein said wireless transceiver and controller comprise a software defined radio.

6. The communications system according to claim 1 wherein said controller comprises a cryptographic unit configured to encrypt sensitive data.

7. The communications system according to claim 6 wherein said controller comprises a processor coupled to the cryptographic unit and configured to process and forward sensitive data to the cryptographic unit and receive encrypted data and format the encrypted data into data packets.

8. The communications system according to claim 1 wherein said wireless transceiver is operable in a radio frequency range of 1.5 to 30 MHz.

9. The communications system according to claim 1 wherein said wireless transceiver is operable in a radio frequency range of 30 MHz to 300 MHz.

10. A communications device comprising:
    a wireless transceiver configured to provide a communications link between a sender device transmitting data packets in accordance with a Transmission Control Protocol (TCP) and a receiver device configured to receive the data packets from the sender device, wherein said communications link is susceptible to at least one of transmission delays and transmission errors; and
    a controller coupled to said wireless transceiver and configured to serve as a TCP proxy between the sender device and the receiver device by sending successive simulated TCP acknowledgements of delivery to the sender device over the communications link in accordance with the TCP starting at a delay time shorter than a TCP retransmission timeout period and increasing the delay time for each successive simulated TCP acknowledgement;
    wherein the TCP is maintained throughout the communications link between said sender device and receiver device.

11. The communications device according to claim 10 wherein said controller is configured to increase the delay time until the delay time is equal to an actual round trip time (RTT) for the data packets from the sender device to the receiver device.

12. The communications device according to claim 10 wherein said controller comprises a processor and memory coupled thereto configured to buffer data packets.

13. The communications device according to claim 12 wherein said processor is configured to generate a simulated TCP acknowledgement of delivery after buffering a plurality of data packets in the memory.

14. The communications device according to claim 10 wherein said wireless transceiver and controller comprise a software defined radio.

15. The communications device according to claim 10 wherein said controller comprises a cryptographic unit configured to encrypt sensitive data.

16. The communications device according to claim 15 wherein said controller comprises a processor coupled to the cryptographic unit and configured to process and forward sensitive data to the cryptographic unit and receive encrypted data and format the encrypted data into data packets.

17. The communications device according to claim 10 wherein said wireless transceiver is an RF transceiver operable in a frequency range of 1.5 to 30 MHz.

18. The communications device according to claim 10 wherein said wireless transceiver is operable in a radio frequency range of 30 to 300 MHz.

19. A method of communicating comprising:
sending data packets in accordance with a Transmission Control Protocol (TCP) from a sender device to a receiver device; and
processing the data packets within an intermediate device coupled between the sender device and the receiver device, the intermediate device comprising
a wireless transceiver configured to provide a communications link between the sender device and said receiver device and wherein said communications link is susceptible to at least one of transmission delays and transmission errors, and
a controller coupled to the wireless transceiver and configured to serve as a TCP proxy between the sender device and the receiver device by sending successive simulated TCP acknowledgements of delivery to the sender device over the communications link in accordance with the TCP starting at a delay time shorter than a TCP retransmission timeout period and increasing the delay time for each successive simulated TCP acknowledgement;
wherein the TCP is maintained throughout the communications link between said sender device and receiver device.

20. The method according to claim 19 further comprising increasing the delay time until the delay time is equal to an actual round trip time (RTT) for the data packets from the sender device to the receiver device.

21. The method according to claim 19 further comprising buffering the data packets in a memory.

22. The method according to claim 21 further comprising generating a simulated TCP acknowledgement of delivery after buffering a plurality of the data packets in the memory.

23. The method according to claim 19 wherein the wireless transceiver and controller comprise a software defined radio.

24. The method according to claim 19 wherein the controller comprises a cryptographic unit configured to encrypt sensitive data.

* * * * *